United States Patent
Bertele

[15] 3,698,796
[45] Oct. 17, 1972

[54] OBJECTIVE CONSISTING OF FIVE LENS MEMBERS

[72] Inventor: Ludwig Bertele, Heerbrugg, Switzerland

[73] Assignee: Firma Wild Heerbrugg AG, Heerbrugg, Switzerland; a part interest

[22] Filed: March 15, 1971

[21] Appl. No.: 124,276

[30] Foreign Application Priority Data

March 17, 1970 Switzerland.............4037/70

[52] U.S. Cl....................................350/216, 350/220
[51] Int. Cl.............................G02b 9/34, G02b 9/60
[58] Field of Search....................350/216, 220, 215

[56] References Cited

UNITED STATES PATENTS

| | | | |
|---|---|---|---|
| 2,549,159 | 4/1951 | Bertele | 350/220 |
| 2,186,621 | 1/1940 | Bertele | 350/220 |
| 3,507,558 | 4/1970 | Shimizu | 350/215 X |
| 3,039,361 | 6/1962 | Baker | 350/215 X |

*Primary Examiner*—John K. Corbin
*Attorney*—Werner W. Kleeman

[57] ABSTRACT

An objective consisting of five lens members. The first two lens members are menisci curved towards the object, the first lens member having collective refractive power and the second lens member being composed of at least two separate lenses. The third and fourth lens members have a collective effect and consists of several individual lenses. The fifth lens member is a meniscus with dispersive refractive power, cemented from several separate lenses and curved towards the image. The invention contemplates that the third lens member includes a cemented surface curved towards the image and of stronger curvature than the other cemented surfaces in this lens member, the refractive index $n_d$ of the lens adjoining this surface on the image side being smaller than the lens adjoining it on the object side, while the opposite relationship applies as regards the Abbe numbers $\gamma$ of these lenses.

2 Claims, 2 Drawing Figures

PATENTED OCT 17 1972

3,698,796

INVENTOR
LUDWIG BERTELE
BY
WERNER W. KLEEMAN
ATTORNEY

OBJECTIVE CONSISTING OF FIVE LENS MEMBERS

BACKGROUND AND SUMMARY OF THE INVENTION

The present invention relates to an improved objective of the type consisting of five lens members.

In the objective of the invention the first two lens members are menisci curved towards the object, the first lens member having collective refractive power and the second lens member being composed of at least two separate lenses. The third and fourth lens members have collective power and consist of several separate lenses and the fifth lens member is a meniscus with dispersive refractive power which is cemented from several separate lenses and is curved towards the image. Importantly, the invention contemplates that a cemented surface curved towards the image is arranged in the third lens member and this cemented surface is of stronger curvature than the other cemented surfaces in said third lens member, the refractive index $n_d$ of the lens adjoining the said surface on the image side being smaller than that of the lens adjoining the object side, whereas the opposite relationship applies as regards the Abbe numbers $\gamma$ of these lenses.

Objectives of this type have been successfully used in photogrammetric measurement and are described in detail in Swiss Pat. No. 262,596. As a consequence of a lengthening of the focal length, caused by the magnification of the image format, values which no longer guarantee the required image efficiency are produced for certain residual image-forming errors. Above all, apart from a reduction in the zonal bulging or convexity of the spherical aberration curve, a satisfactory course of said curve is essential within a wide range of the spectrum. It is known to improve such image-forming errors through the use of a strongly curved cemented surface with a low refractive index graduation. Of decisive importance for achieving success is, however, the position thereof in the objective, in order to also extend the image-improving influence to the abaxial image portions. In this respect, the different types of objectives behave quite differently.

With the type of objective according to the aforementioned Swiss patent investigations have shown that, as contemplated by the invention, the most favorable position of such cemented surface is in the third lens member, this surface having such a strong curvature towards the image that it is stronger than that of the other cemented surfaces in this lens member. In this way, both the refractive index and the color-dispersing power on the image side of this cemented surface is smaller than on the object side thereof. This cemented surface is advantageously so arranged that, of all cemented surfaces in this lens member, it is closest to the second lens member.

The invention will be better understood, and objects other than those set forth above, will become apparent when consideration is given to the following detailed description thereof. Such description makes reference to the annexed drawing illustrating two constructional forms of the objective according to the invention and corresponding to the accompanying examples given hereinafter, and wherein:

FIG. 1 schematically illustrates a first embodiment of inventive objective corresponding to the hereinafter given Example 1; and FIG. 2 schematically depicts a second embodiment of inventive objective corresponding to the hereinafter given Example 2.

DETAILED DESCRIPTION OF THE PREFERRED EMBODIMENTS

Figure 1:
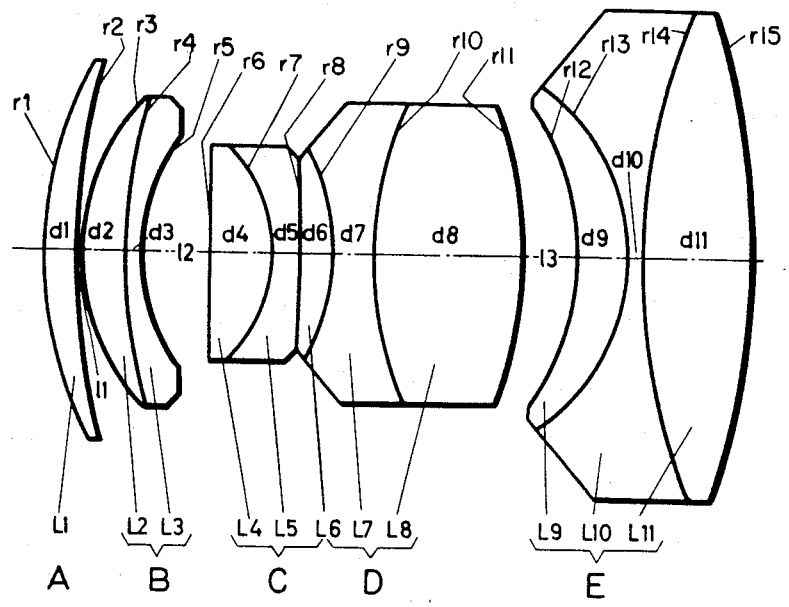
Figure 2:
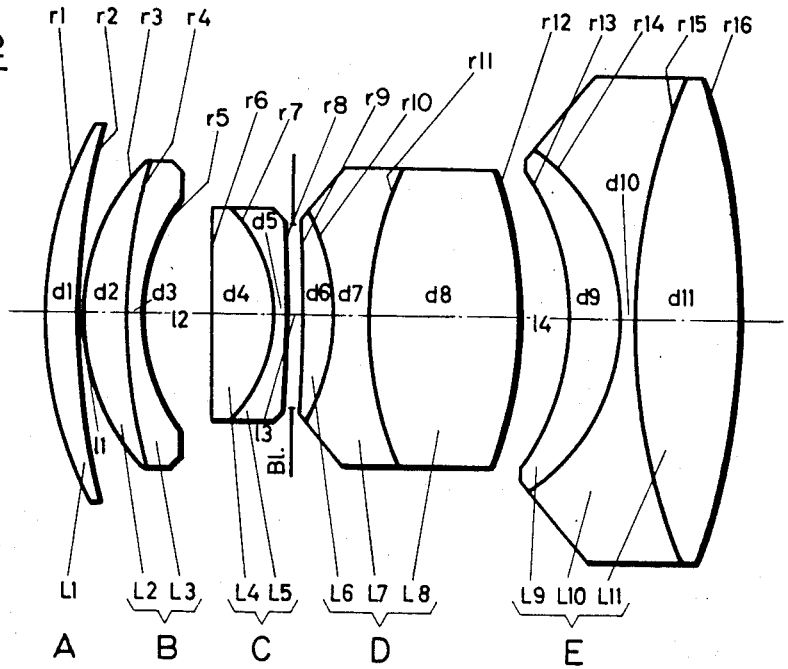

Describing now the drawings, in FIGS. 1 and 2, corresponding to Examples 1 and 2 respectively, the objective in each instance will be understood to consist of five lens members A, B, C, D and E. The first two lens members A, B are menisci curved towards the object. The first lens member A incorporates the lens $L_1$ facing the object and has collective refractive power. The second lens member B is composed of at least two separate lenses $L_2$ and $L_3$. The third lens member C is composed of the individual lenses $L_4$, $L_5$, and the fourth lens member D is composed of the individual lenses $L_6$, $L_7$ and $L_8$ and possess a collective effect. The fifth lens member E is a meniscus with dispersive refractive power, cemented from several separate lenses $L_9$, $L_{10}$ and $L_{11}$ and is curved towards the image.

In Example 1, corresponding to the showing of FIG. 1, the surface $r_7$ in the third lens member C has the strongest curvature of all cemented surfaces in said lens member and is curved towards the image. On the image side of this surface, $n_d$, being 1.59197, is smaller by 0.00723, and the $\gamma$ value (Abbe number) is higher by 3.45, than on the object side.

In Example 2, corresponding to the showing of FIG. 2, the third and fourth lens member C and D subdivided into system components $L_4$, $L_5$ and $L_6$, $L_7$ and $L_8$ respectively in order to provide an air space accommodating the iris diaphragm. This step scarcely influences the image-forming errors, so that neither the position of $r_7$ nor the graduation of the refractive indices and of the $\gamma$ values have experienced any change as compared with Example 1. In both cases the most strongly curved cemented surface ($r_7$) is in the lens member C and is closest to the second lens member (B).

The data relate to a focal length of 100 mm, the aperture ratio is 1:4 and the image angle is approximately ± 28°. Reference characters A – E are the separate lens members, L are the separate lenses, r are the radii of curvature, d are the thicknesses and l are the air spaces. The refractive index $n_d$ and the Abbe number $\gamma$ characterize the types of glass.

EXAMPLE 1

(FIG. 1)

| Lens | r | | d | $n_d$ | d |
|---|---|---|---|---|---|
| $L_1$ | $r_1$ | =+ 37.89 | $d_1$=3.18 | 1.66882 | 57.4 |
| | $r_2$ | =+ 68.47 | $l_1$=0.10 | | |
| $L_2$ | $r_3$ | =+ 21.43 | $d_2$=4.32 | 1.69100 | 54.8 |
| $L_3$ | $r_4$ | =+ 51.19 | $d_3$=1.63 | 1.68065 | 37.4 |
| | $r_5$ | =+ 18.29 | | | |
| | | | $l_2$=6.65 | | |
| $L_4$ | $r_6$ | =− 2070.00 | $d_4$=6.20 | 1.59920 | 45.1 |
| $L_5$ | $r_7$ | =− 14.55 | $d_5$=2.90 | 1.59197 | 48.5 |
| $L_6$ | $r_8$ | =− 180.00 | $d_6$=2.97 | 1.47069 | 67.3 |
| $L_7$ | $r_9$ | =− 20.61 | $d_7$=3.59 | 1.61340 | 44.3 |
| $L_8$ | $r_{10}$ | =+ 34.77 | $d_8$=14.80 | 1.74400 | 50.8 |
| | $r_{11}$ | =− 40.67 | | | |

| | | | | | $n_d$ | $d$ |
|---|---|---|---|---|---|---|
| | | $r_{12}$ | = − 24.68 | | | |
| $L_9$ | | | | $l_3$=5.15 | | |
| | | $r_{13}$ | = − 20.14 | $d_9$=4.95 | 1.69100 | 54.7 |
| $L_{10}$ | | | | $d_{10}$=1.67 | 1.53113 | 62.2 |
| | | $r_{14}$ | = + 60.67 | | | |
| $L_{11}$ | | | | $d_{11}$=10.20 | 1.46450 | 65.8 |
| | | $r_{15}$ | = − 72.66 | | | |
| | | $s_0'$=48.2 | F=100.6 | | | |

EXAMPLE 2

(FIG. 2)

| | | | | | $n_d$ | $d$ |
|---|---|---|---|---|---|---|
| | | $r_1$ | = + 37.89 | | | |
| $L_1$ | | | | $d_1$=3.18 | 1.66882 | 57.4 |
| | | $r_2$ | = + 68.47 | | | |
| | | | | $l_1$=0.10 | | |
| | | $r_3$ | = + 21.43 | | | |
| $L_2$ | | | | $d_2$=4.32 | 1.69100 | 54.8 |
| | | $r_4$ | = + 51.19 | | | |
| $L_3$ | | | | $d_3$=1.63 | 1.68065 | 37.4 |
| | | $r_5$ | = + 18.29 | | | |
| | | | | $l_2$=6.65 | | |
| | | $r_6$ | = − 1662.00 | | | |
| $L_4$ | | | | $d_4$=6.20 | 1.59920 | 45.1 |
| | | $r_7$ | = − 14.55 | | | |
| $L_5$ | | | | $d_5$=1.33 | 1.59197 | 48.5 |
| | | $r_8$ | = − 182.82 | | | |
| | | | | $l_3$=1.00 | | |
| | | $r_9$ | = − 176.00 | | | |
| $L_6$ | | | | $d_6$=3.00 | 1.47069 | 67.3 |
| | | $r_{10}$ | = − 20.37 | | | |
| $L_7$ | | | | $d_7$=3.56 | 1.61340 | 44.3 |
| | | $r_{11}$ | = + 34.77 | | | |
| $L_8$ | | | | $d_8$=15.13 | 1.74400 | 50.8 |
| | | $r_{12}$ | = − 40.41 | | | |
| | | | | $l_4$=5.15 | | |
| | | $r_{13}$ | = − 24.68 | | | |
| $L_9$ | | | | $d_9$=4.95 | 1.69100 | 54.7 |
| | | $r_{14}$ | = − 20.14 | | | |
| $L_{10}$ | | | | $d_{10}$=1.81 | 1.53113 | 62.2 |
| | | $r_{15}$ | = + 60.67 | | | |
| $L_{11}$ | | | | $d_{11}$=10.20 | 1.46450 | 65.8 |
| | | $r_{16}$ | = − 71.11 | | | |
| | | $s_0'$=48.2 | F=100.8 | | | |

While there is shown and described present preferred embodiments of the invention, it is to be distinctly understood that the invention is not limited thereto but may be otherwise variously embodied and practiced within the scope of the following claims.

What is claimed is:

1. An objective consisting of five lens members, said objective viewed from the side of the object consisting of:

a. a first lens member constituting a collecting meniscus curved towards the object;
   b. a second lens member constituting a meniscus curved towards the object and composed of at least two lenses;
   c. a third lens member consisting of a cemented collecting lens and a dispersing lens, both the refractive index and the color-dispersing power of the glass of the collecting lens being greater than that of the next successive dispersing lens and the cemented surface possesses the smallest radius of curvature of all lens surfaces of the objective;
   d. a fourth lens member possessing collective refractive power and composed of at least three individual lenses, two collecting lenses enclosing a dispersing lens; and
   e. a fifth lens member constituting a meniscus of dispersive refractive power and curved towards the image, said fifth lens member possessing at least one cemented surface curved towards the object and having a refractive index at the side of the image which is smaller than at the side of the object.

2. The objective as defined in claim 1, wherein said third lens member and said fourth lens member are cemented to one another.

* * * * *